US012450785B2

(12) United States Patent
Agrawal et al.

(10) Patent No.: US 12,450,785 B2
(45) Date of Patent: Oct. 21, 2025

(54) VELOCITY BASED DYNAMIC AUGMENTED REALITY OBJECT ADJUSTMENT

(71) Applicant: International Business Machines Corporation, Armonk, NY (US)

(72) Inventors: Tushar Agrawal, West Fargo, ND (US); Sarbajit K. Rakshit, Kolkata (IN); Raghuveer Prasad Nagar, Kota (IN); Thomas Jefferson Sandridge, Tampa, FL (US)

(73) Assignee: International Business Machines Corporation, Armonk, NY (US)

( * ) Notice: Subject to any disclaimer, the term of this patent is extended or adjusted under 35 U.S.C. 154(b) by 628 days.

(21) Appl. No.: 17/831,482

(22) Filed: Jun. 3, 2022

(65) Prior Publication Data
US 2023/0394713 A1 Dec. 7, 2023

(51) Int. Cl.
*G06T 11/00* (2006.01)
*B60W 60/00* (2020.01)
(Continued)

(52) U.S. Cl.
CPC ......... *G06T 11/00* (2013.01); *B60W 60/0024* (2020.02); *G06F 3/013* (2013.01); *G06T 3/40* (2013.01)

(58) Field of Classification Search
None
See application file for complete search history.

(56) References Cited

U.S. PATENT DOCUMENTS 9,581,457 B1    2/2017   Meredith
9,747,503 B2    8/2017   Shatz
(Continued)

FOREIGN PATENT DOCUMENTS

CN    107924590 A    4/2018
CN    104508597 B    10/2018
CN    110362203 A    10/2019

OTHER PUBLICATIONS

"5 ways augmented reality can improve mobile user experience", wikitude, Jun. 20, 2020, 7 pages, <https://www.wikitude.com/blog-augmented reality-mobile-user-experience/>.
(Continued)

*Primary Examiner* — Frank S Chen
(74) *Attorney, Agent, or Firm* — Andre L. Adkins

(57) ABSTRACT

A computer-implemented method for displaying an augmented reality (AR) object is disclosed. The computer-implemented method includes identifying a physical object of interest in a user's AR field of view (FOV), determining an amount of time required for the physical object of interest to be displayed within the user's AR FOV, based on the user's relative position and movement with respect to the physical object of interest, determining the physical object of interest is no longer in the user's physical FOV prior to an expiration of the determined amount of time required for the physical object to be displayed within the user's AR FOV, and displaying a digital object corresponding to the physical object of interest in the users AR FOV until the determined amount of time required for the physical object to be displayed within the user's AR FOV has expired.

20 Claims, 7 Drawing Sheets

(51) Int. Cl.
  *G06F 3/01* (2006.01)
  *G06T 3/40* (2024.01)

(56) References Cited

U.S. PATENT DOCUMENTS

| | | | |
|---|---|---|---|
| 10,194,990 | B2 | 2/2019 | Amanatullah |
| 2015/0206353 | A1 | 7/2015 | Grasso |
| 2016/0259977 | A1 | 9/2016 | Asbun |
| 2020/0086795 | A1 | 3/2020 | Rakshit |
| 2020/0255026 | A1 | 8/2020 | Katardjiev |
| 2020/0265649 | A1 | 8/2020 | Chaurasia |
| 2021/0134248 | A1* | 5/2021 | Wan .................. G09G 5/12 |
| 2023/0375840 | A1* | 11/2023 | Takemoto .......... G02B 27/0179 |

OTHER PUBLICATIONS

"Augmented Reality Search with Yelp's Monocle Feature", YouTube, Feb. 10, 2012, 3 pages, <https://www.youtube.com/watch?v=z6IRd2JebqA>.

Anonymous, "Context based display of POI's in a GPS car navigation system," An IP.com Prior Art Database Technical Disclosure, Original Publication Date: Jan. 21, 2009, IP.com No. IPCOM000178276D, IP.com Electronic Publication Date: Jan. 21, 2009, 2 pages.

Bodnar, Nathan, "Mobile Based Augmented Reality", Last Modified Apr. 2010, 8 pages, <https://www.cse.wustl.edu/~jain/cse574-10/ftp/reality/index.html>.

Craig, Alan B., Mobile Augmented Reality, ScienceDirect, Understanding Augmented Reality, 2013, 20 pages, <https://www.sciencedirect.com/topics/computer-science/mobile-augmented-reality>.

Dakic, Maja, "Augmented Reality in Mobile Apps Technology—Zesium", 9 pages, downloaded from the Internet on Apr. 7, 2022, <http://zesium.com/powerful-augmented-reality-in-mobile/#:~:text=Markerless%20AR%20is%20the%20most,and%20other%20location%20centered%20apps>.

Gallagher, Juliet, College Student Creates "Scroll," a Ring That Lets You Control Your AR Experience, Aug. 7, 2017, Next Reality, 5 pages, <https://augmented.reality.news/news/college-student-creates-scroll-ring-lets-you-control-your-ar-experience-0179308/>.

Greene, Tristan, "IBM and Unity are teaming up to bring Watson's AI to VR and AR games", TNW, article published on Feb. 20, 2018, 5 pages, <https://thenextweb.com/artificial-intelligence/2018/02/20/IBM-and-unity-are-learning-up-to-bring-watsons-ai-to-vr-and-ar-games/>.

IBM, "AR/VR meets enterprise", downloaded from the Internet Wayback machine on Apr. 8, 2022, archived on Mar. 10, 2019, 3 pages, <https://web.archive.org/web/20190310214329/https://www.ibm.com/design/v1/language/experience/vrar/>.

Mell et al., "The NIST Definition of Cloud Computing", Recommendations of the National Institute of Standards and Technology, NIST Special Publication 800-145, Sep. 2011, 7 pages.

* cited by examiner

VELOCITY BASED DYNAMIC AUGMENTED REALITY OBJECT ADJUSTMENT

BACKGROUND

The present invention relates generally to the field of augmented reality, and more particularly to, dynamically altering an object in an augmented reality field of view based on the relative velocity of the user and the object.

Augmented reality (AR) is an interactive experience of a real-world environment where the objects that reside in the real world are enhanced by computer-generated perceptual information, sometimes across multiple sensory modalities, including visual, auditory, haptic, somatosensory and olfactory. Field of view (FOV) is the open observable area a person can see through his or her eyes or via an optical device. Field of view in AR is how "big" an augmented reality image is when viewed through a headset or smart glasses.

SUMMARY

According to one embodiment of the present invention, a computer-implemented method for displaying an augmented reality object is disclosed. The computer-implemented method includes identifying a physical object of interest in a user's augmented reality field of view. The computer-implemented method further includes determining an amount of time required for the physical object of interest to be displayed within the user's augmented reality field of view, based, at least in part, on the user's relative position and movement with respect to the physical object of interest. The computer-implemented method further includes determining the physical object of interest is no longer in the user's physical field of view prior to an expiration of the determined amount of time required for the physical object to be displayed within the user's augmented reality field of view. The computer-implemented method further includes displaying, in response to determining that the physical object of interest is no longer in the user's augmented reality field of view prior to the expiration of the determined amount of time, a digital object corresponding to the physical object of interest in the users augmented reality field of view until the determined amount of time required for the physical object to be displayed within the user's augmented reality field of view has expired.

According to another embodiment of the present invention, a computer program product for displaying an augmented reality object is disclosed. The computer program product includes one or more computer readable storage media and program instructions stored on the one or more computer readable storage media. The program instructions include instructions to identify a physical object of interest in a user's augmented reality field of view. The program instructions further include instructions to determine an amount of time required for the physical object of interest to be displayed within the user's augmented reality field of view, based, at least in part, on the user's relative position and movement with respect to the physical object of interest. The program instructions further include instructions to determine the physical object of interest is no longer in the user's physical field of view prior to an expiration of the determined amount of time required for the physical object to be displayed within the user's augmented reality field of view. The program instructions further include instructions to display, in response to determining that the physical object of interest is no longer in the user's augmented reality field of view prior to the expiration of the determined amount of time, a digital object corresponding to the physical object of interest in the users augmented reality field of view until the determined amount of time required for the physical object to be displayed within the user's augmented reality field of view has expired.

According to another embodiment of the present invention, a computer system for displaying an augmented reality object is disclosed. The computer system includes one or more computer processors, one or more computer readable storage media, and computer program instructions, the computer program instructions being stored on the one or more computer readable storage media for execution by the one or more computer processors. The program instructions include instructions to identify a physical object of interest in a user's augmented reality field of view. The program instructions further include instructions to determine an amount of time required for the physical object of interest to be displayed within the user's augmented reality field of view, based, at least in part, on the user's relative position and movement with respect to the physical object of interest. The program instructions further include instructions to determine the physical object of interest is no longer in the user's physical field of view prior to an expiration of the determined amount of time required for the physical object to be displayed within the user's augmented reality field of view. The program instructions further include instructions to display, in response to determining that the physical object of interest is no longer in the user's augmented reality field of view prior to the expiration of the determined amount of time, a digital object corresponding to the physical object of interest in the users augmented reality field of view until the determined amount of time required for the physical object to be displayed within the user's augmented reality field of view has expired.

BRIEF DESCRIPTION OF DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
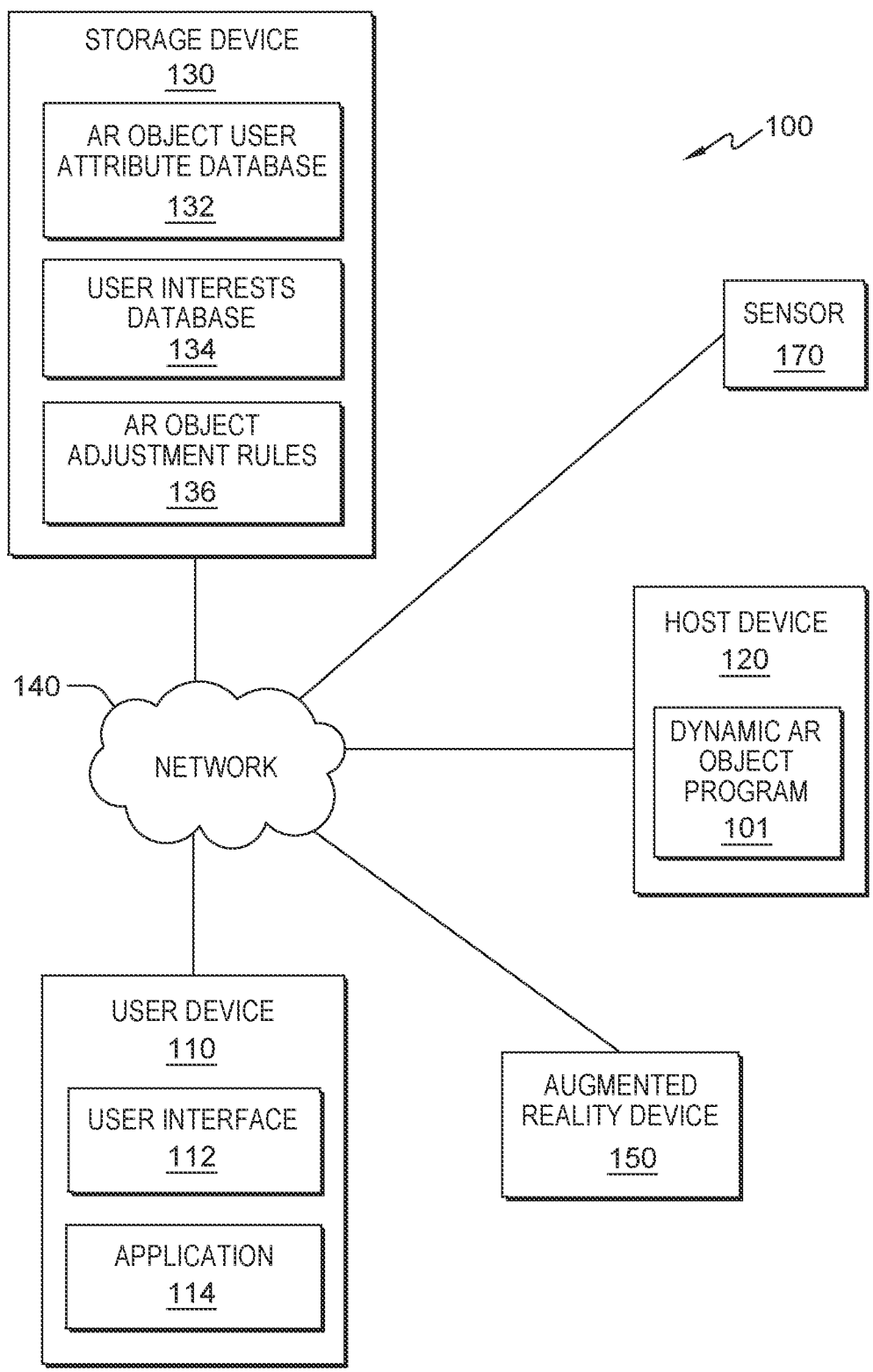
FIG. 1 is a block diagram of a network computing environment for dynamic AR object program 101, generally designated 100, in accordance with at least one embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present invention relates generally to the field of augmented reality, and more particularly to, dynamically altering an object in an augmented reality field of view based on the relative velocity of the user and the object.

When wearing a head mounted augmented reality (AR) device, a user can visualize digital objects in near eye display. For example, the AR object can be information about any object, advertisement, or map data. In many scenarios, a user may want to have additional information about a location or object in their field of view, and AR is one of the most suitable manners to provide this additional information within the user's field of view.

Based on the movement of the of the user, the relative position, direction, and distance of the place/location will be changed. When an individual is moving at any speed, if an AR object is associated with a physical object within the Field of view (FoV) of the user, then, based on the change in position, direction, and distance of the user from the said physical object, the position of the AR object will gradually become irrelevant. However sometimes the user is unable to finish reading or interpreting the AR object associated with the object before the AR object is out of their FOV. For example, an individual is travelling in a vehicle and sees a roadside shop in the users FOV. The AR device shows associated information about the shop. As the position of the vehicle continues to change, so too does the relative position of the user with respect to the shop. Eventually, the shop will no longer be present in the user's field of view, at which point the AR object associated with the shop is no longer displayed to the user. However, based on the movement or velocity of the user, the user may not have read or seen everything they wanted to for the roadway shop in time before it left the user's field of view. Meaning the user still wants additional information about the roadway shop after it is no longer in the user's field of view. Accordingly, embodiments of the present invention recognize the need to customize the AR object based on the user movement relative to the physical object. Embodiments of the present invention display certain AR objects in the users AR field of view for a predetermined amount of time to ensure the user has enough time to gather information on the desired AR object.

Embodiments of the present invention improve upon or advantageously provide for a computer implemented method, computer program product, and computer system for identifying and dynamically altering an object in an augmented reality field of view based on the relative velocity of the user and the object. Embodiments of the present invention customize the duration of displaying an object in the AR field of view based, at least in part, on the user's attributes. User attributes can include the users reading speed, users eye movement, user input, duration of time looking at an object, numbers of times looking at an object, or user history. Embodiments of the present invention track the speed and direction of movement of the user, predict how long an object will be available within user's Field of View and determine the user's interest in the object. Accordingly, embodiments of the present invention take an appropriate action such as customizing the AR object and controlling the user movement. Customizing the AR object can include identifying when the AR object should be shown, how long the AR object can be shown against said physical object, etc.

Based on relative change in speed, position, and direction of any physical object within the Field of View (FOV) of the user, embodiments of the present invention predict how long any physical object will be available within the Field of view of the user, and accordingly identify appropriate timing when the AR object should be shown in the AR glass to ensure the user has enough time to view the AR object. Embodiments of the present invention display the AR object in the Field of view of the user after the physical object is no longer in the users field of view to ensure the user has enough time to read, consume, or understand the AR object. Embodiments of the present invention customize the AR content for any physical object so that the user can read or watch the AR content within the amount of time necessary to fully comprehend/finish reading or watching the AR content.

Embodiments of the present invention historically track the user's reading speed of any AR object while in motion, and accordingly identify how much content can be shown to the user for any physical object while the user is in motion. Embodiments of the present invention dynamically align the AR object, so that user can read the AR content in a comfortable manner when the user is in motion. For example, embodiments of the present invention enlarge text to ensure the user can read the AR content in a comfortable manner. In embodiments when the user is in an autonomous vehicle, embodiments of the present invention dynamically adjust the speed of the autonomous vehicle, to ensure the user can read the AR content. Embodiments of the present invention identify the user's level of interest on any AR object based on user's eye gaze tracking while the user is in motion, and accordingly embodiments of the present invention will identify which AR object to align based on change in direction of the user from the physical object. Embodiments of the present invention indicate using text, voice, or visual indicator that the AR object will be out of AR glass view due to the user movement. For example, AR object color fading gradually when an interesting physical object is out of FOV. In another example, if the user did not finish reading or have enough time to view the object, embodiments of the present invention indicate using text, voice, or visual indicator a summary of the text or the object.

Embodiments of the present invention also recognize in some instances the user will be stationary and the physical object will be in motion. Embodiments of the present invention determine the velocity, speed, direction, or movement of the object relative to the user. Embodiments of the present invention determine the amount of time the user needs to understand the object and displays the object in the users AR field of view for the determined amount of time.

The present invention may be a system, a method, and/or a computer program product at any possible technical detail level of integration. The computer program product may include a computer readable storage medium (or media) having computer readable program instructions thereon for causing a processor to carry out aspects of the present.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suit-able combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention will now be described in detail with reference to the Figures. FIG. 1 is a functional block diagram of a network computing environment for dynamic AR object program 101, generally designated 100, in accordance with at least one embodiment of the present invention. In an embodiment, network computing environment 100 may be provided by cloud computing environment 50, as depicted and described with reference to FIG. 6, in accordance with at least one embodiment of the present invention. FIG. 1 provides an illustration of only one implementation and does not imply any limitations with regard to the environments in which different embodiments may be implemented. Many modifications to the depicted environment may be made by those skilled in the art without departing from the scope of the present invention as recited by the claims.

Network computing environment 100 includes user device 110, host device 120, storage device 130, augmented reality device 150, and sensor 170, interconnected over network 140. User device 110 may represent a computing device of a user, such as a laptop computer, a tablet computer, a netbook computer, a personal computer, a desktop computer, a personal digital assistant (PDA), a smart phone, a wearable device (e.g., smart glasses, smart watches, e-textiles, AR headsets, etc.), or any programmable computer systems known in the art. In general, user device 110 can represent any programmable electronic device or combination of programmable electronic devices capable of executing machine readable program instructions and communicating with host device 120, storage device 130, augmented reality device 150, sensor 170, and other devices (not depicted) via a network, such as network 140. User device 110 can include internal and external hardware components, as depicted and described in further detail with respect to FIG. 5. In an embodiment, augmented reality device 150 and/or sensor 170 is integrated with user device 110.

User device 110 further includes user interface 112 and application 114. User interface 112 is a program that provides an interface between a user of an end user device, such as user device 110, and a plurality of applications that reside on the device (e.g., application 114). A user interface, such as user interface 112, refers to the information (such as graphic, text, and sound) that a program presents to a user, and the control sequences the user employs to control the program. A variety of types of user interfaces exist. In one embodiment, user interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 is a script or application programming interface (API). In an embodiment, user interface 112 displays the users augmented reality field of view. For example, a user is wearing augmented reality device 150 and user interface 112 displays the user's field of view. In an embodiment, a user interacts with user interface 112 to input data. For example, a user uploads data associated with the users reading speed or eye sight.

Application 114 can be representative of one or more applications (e.g., an application suite) that operate on user device 110. In an embodiment, application 114 is representative of one or more applications (e.g., augmented reality applications, streaming applications, entertainment applications, and video game applications) located on user device 110. In various example embodiments, application 114 can be an application that a user of user device 110 utilizes to view or interact with dynamic AR object program 101 and augmented reality device 150. In an embodiment, application 114 can be a client-side application associated with a server-side application running on host device 120 (e.g., a client-side application associated with dynamic AR object program 101). In an embodiment, application 114 can operate to perform processing steps of dynamic AR object program 101 (i.e., application 114 can be representative of dynamic AR object program 101 operating on user device 110).

Host device 120 is configured to provide resources to various computing devices, such as user device 110. For example, host device 120 may host various resources, such as dynamic AR object program 101 that are accessed and utilized by a plurality of devices such as user device 110, storage device 130, augmented reality device 150, or any other device connected over network 140. In various embodiments, host device 120 is a computing device that can be a standalone device, a management server, a web server, an application server, a mobile device, or any other electronic device or computing system capable of receiving, sending, and processing data. In an embodiment, host device 120 represents a server computing system utilizing multiple computers as a server system, such as in a cloud computing environment. In an embodiment, host device 120 represents a computing system utilizing clustered computers and components (e.g., database server computer, application server computer, web server computer, webmail server computer, media server computer, etc.) that act as a single pool of seamless resources when accessed within network computing environment 100. In general, host device 120 represents any programmable electronic device or combination of programmable electronic devices capable of executing machine readable program instructions and communicating with each other, as well as with user device 110, storage device 130, augmented reality device 150, sensor 170, and other computing devices (not shown within network computing environment 100 via a network, such as network 140.

Figure 5:
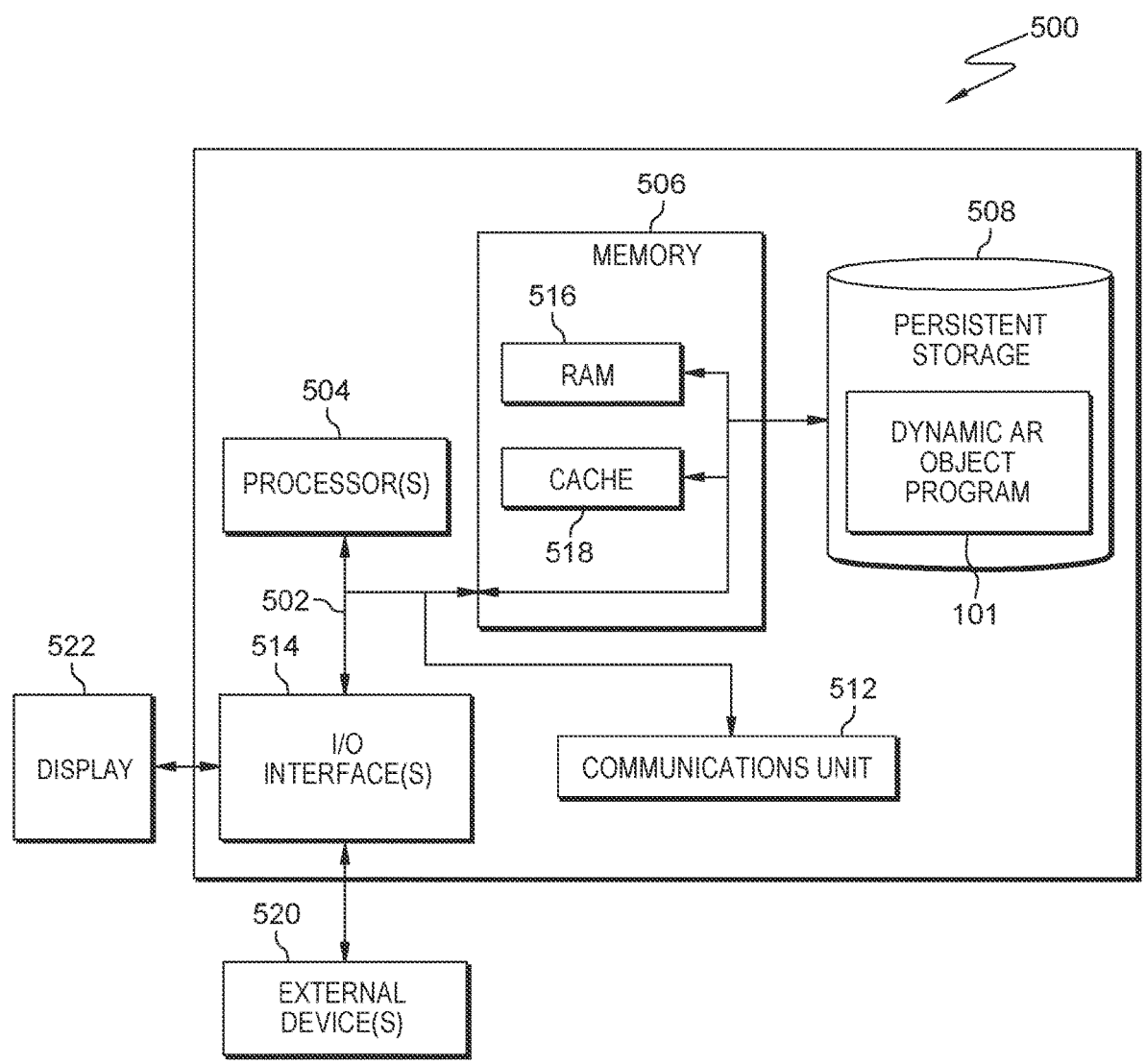
FIG. 5 is a block diagram depicting components of a computer, generally designated 500, suitable for executing an dynamic AR object program 101 in accordance with at least one embodiment of the present invention.
Figure 6:
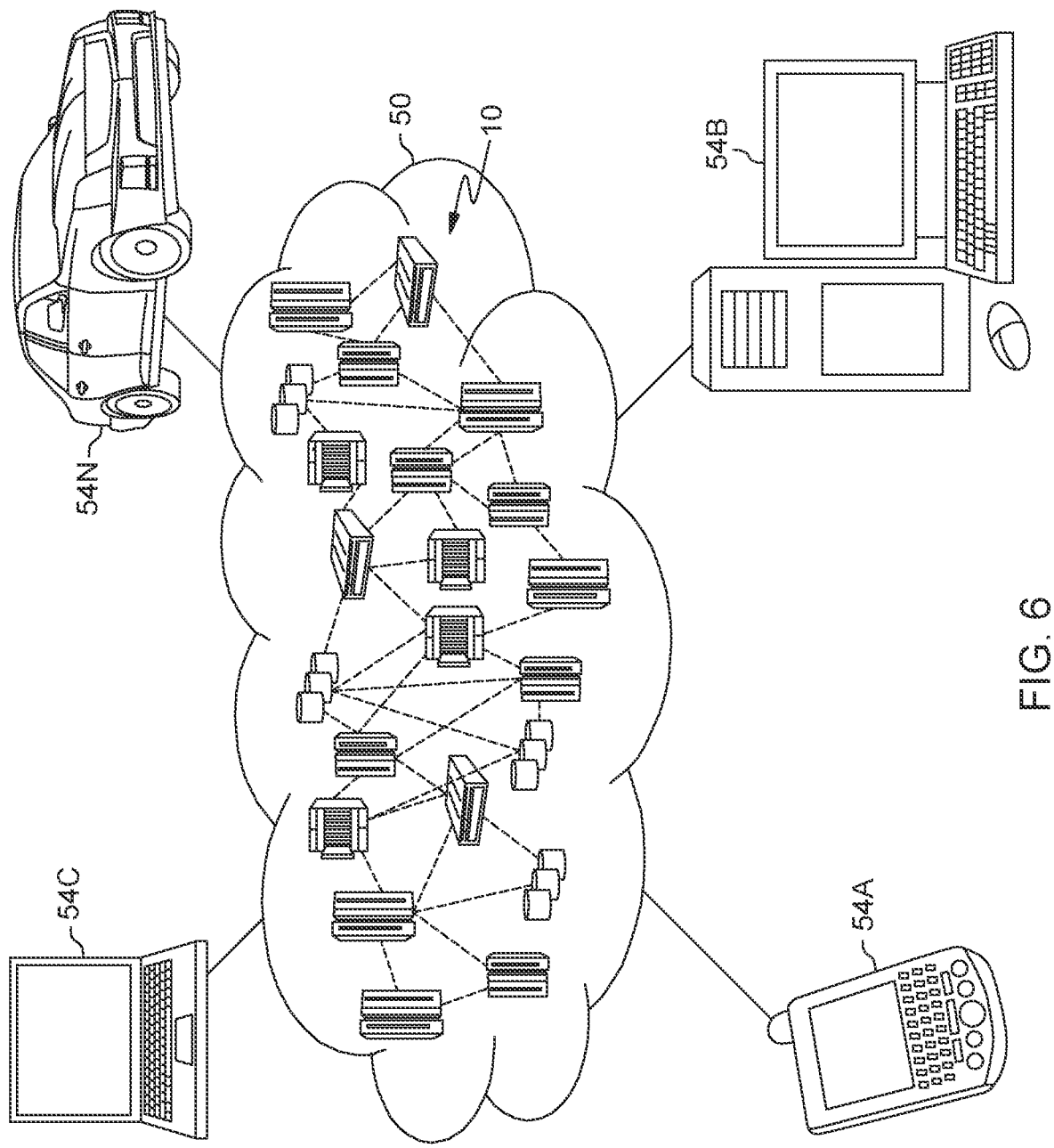
FIG. 6 is a block diagram depicting a cloud computing environment 50 in accordance with at least one embodiment of the present invention.

Host device 120 may include components as depicted and described in detail with respect to cloud computing node 10, as described in reference to FIG. 6, in accordance with at least one embodiment of the present invention. Host device 120 may include components, as depicted and described in detail with respect to computing device 500 of FIG. 5, in accordance with at least one embodiment of the present invention.

In various embodiments, storage device 130 is a secure data repository for persistently storing AR object user attribute database 132, user interest's database 134, and AR object adjustment rules 136 utilized by various applications and user devices of a user, such as user device 110 and augmented reality device 150. Storage device 130 may be implemented using any volatile or non-volatile storage media known in the art for storing data. For example, storage device 130 may be implemented with a tape library, optical library, one or more independent hard disk drives, multiple hard disk drives in a redundant array of independent disks (RAID), solid-state drives (SSD), random-access memory (RAM), and any possible combination thereof. Similarly, storage device 130 may be implemented with any suitable storage architecture known in the art, such as a relational database, an object-oriented database, or one or more tables.

In an embodiment, dynamic AR object program 101 may be configured to access various data sources, such as AR object user attribute database 132, user interests database 134, and AR object adjustment rules 136, that may include personal data, content, contextual data, or information that a user does not want to be processed. Personal data includes personally identifying information or sensitive personal information as well as user information, such as location tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. In an embodiment, dynamic AR object program 101 enables the authorized and secure processing of personal data. In an embodiment, dynamic AR object program 101 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. In an embodiment, dynamic AR object program 101 provides information regarding personal data and the nature (e.g., type, scope, purpose, duration, etc.) of the processing. In an embodiment, dynamic AR object program 101 provides a user with copies of stored personal data. In an embodiment, dynamic AR object program 101 allows for the correction or completion of incorrect or incomplete personal data. In an embodiment, dynamic AR object program 101 allows for the immediate deletion of personal data.

In an embodiment, AR object user attribute database 132 includes information on a user's reading speed, eyesight, visual acuity, or any type of metrics associated with a user. pertaining to reading speeds of one or more users. In an embodiment, dynamic AR object program 101 receives user input on the users reading speed. For example, dynamic AR object program 101 receives user input that users reading speed is 100 words per minute and stores this information in AR object user attribute database 132. In an embodiment, dynamic AR object program 101 determines users reading speed by timing the amount of time it takes a user to read a certain number of words. For example, if dynamic AR object program 101 presents 250 words to user A and it takes user A 2 minutes to read the 250 words, dynamic AR object program 101 determines user A's reading speed is 125 words per minute and stores this information in AR object user attribute database 132.

In an embodiment, AR object user attribute database 132 includes information on the users eyesight to determine how large an AR object needs to be displayed. In an embodiment, AR object user attribute database 132 includes information on the users visual acuity. For example, if the users visual acuity is low, and dynamic AR object program 101 determines the text is illegible, increases the size of text below a predetermined threshold to a size above a predetermined threshold. In an embodiment, AR object user attribute database 132 includes information on lighting conditions or contrast preferences. For example, a user prefers black text over white text or the user prefers an 80% or higher contrast between the text and the text background. For example, the physical object which the AR object is superimposed can affect the color of the text. For example, if the physical object is a blue billboard, dynamic AR object program 101 superimposes white text from the billboard on the blue billboard making it easier for the user to read the text. In an embodiment, AR object user attribute database 132 includes information on reading speed based on the velocity, speed, or direction in which the user is moving. For example, the users reading speed may be different based on if they are moving towards or away from an object. For example, AR object size is increased as user moves away from physical object displayed, and AR object size is decreased as user moves towards physical object. In an embodiment, dynamic AR object program 101 displays a predetermined amount of the object based on the users reading speed. For example, dynamic AR object program 101 displays a first half of text found on a billboard for 15 seconds and then displays the second half of the text after 15 seconds to ensure the user has enough time to read the text and the text is large enough.

In an embodiment, user interest database 134 stores information on one or more user interests. In an embodiment, dynamic AR object program 101 receives user input on the user's interests. For example, dynamic AR object program 101 receives user input that user interests include farmers markets and stores this information in user interest's database 134. In an embodiment, dynamic AR object program 101 determines users interest by tracking the location of a user's eyesight with respect to particular objects with the users FOV. For example, if dynamic AR object program 101 detects an airplane and determines the location of user's eyesight is watching the plane for the entirety the time the airplane is in the user's field of view, dynamic AR object program 101 determines users interest is airplanes and stores this information in user interest's database 134.

In an embodiment, AR object adjustment rules 136 include a dynamic set of rules or policies for an object in an augmented reality point of view, based at least in part, on information included in user interest's database 134, and external environment factors. In an embodiment, the AR object adjustment rules 136 includes information describing different decision-making actions dynamic AR object program 101 should perform depending on the particular detected physical object within a user's FOV, information included in AR object user attribute database 132 and user interests database 134, and the surrounding environment. In an embodiment, the surrounding or external environment factors include other objects in the augmented reality point of view, the relative speed or direction of motion of the user, the relative speed or direction of motion of the object. In an embodiment, dynamic AR object program 101 accesses AR object adjustment rules 136 to determine the duration, qualities, or other aspects of an object in an augmented reality point of view.

In an embodiment, augmented reality device 150 is any device capable of displaying augmented reality. In an embodiment, augmented reality device 150 includes AR glasses, AR headsets, a mobile device, or any other electronic device capable of using digital visual elements, sound, or other sensory stimuli delivered via technology. In an embodiment, augmented reality device 150 includes a display screen to display the users augmented reality field of view. In an embodiment, augmented reality device 150 is integrated with user device 110.

In an embodiment, sensor 170 includes any one more sensory stimuli sensor capable of collecting information on the users environment. For example, sensor 170 includes one or more cameras, microphones, speedometer, heat sensors, olfactory sensors, or any other generally known sensors capable of collecting information on the visibility, speeds, movement, sound, smell, or temperature of the environment. In an embodiment, sensor 170 is integrated with user device 110, augmented reality device 150, or a combination thereof.

In an embodiment, dynamic AR object program 101 receives user input. In an embodiment, the user input includes one or more user attributes. In an embodiment, user attributes include user's reading speeds, interests, historical eye movement, or other information pertaining to the user. In an embodiment, user interests are determined based on the user's browser or search history, social media data, or other data pertaining to the user. In an embodiment, dynamic AR object program 101 determines users' level of interest. In an embodiment, dynamic AR object program 101 determines users' level of interest with respect to one or more objects in the user's FOV. In an embodiment, dynamic AR object program 101 determines a users' level of interest based on eye movement or eye tracking. For example, if the user always looks at signs for swimming pools for at least 10 seconds and looks at signs for baseball for less than 1 second, dynamic AR object program 101 determines the user is interested in swimming pools and not baseball. In the same example, dynamic AR object program 101 determines users' level of interest for swimming pools is higher than for baseball. In the same example, dynamic AR object program 101 assigns a score to the level of interest for each users interest. For example, if dynamic AR object program 101 determines users' level of interest for swimming pools is higher than for baseball, dynamic AR object program 101 assigns a higher level of interest to swimming pools than baseball. In an embodiment, dynamic AR object program 101 determines a users' level of interest based on the duration of time the user looks at a particular object in their field of view. In an embodiment, dynamic AR object program 101 assigns a higher level of interest to an object the longer the user looks at a particular object in their field of view. For example, if a user looks at a vintage car for 10 seconds and a street sign for 2 seconds, dynamic AR object program 101 assigns a higher level of interest to the vintage car than the street sign. In an embodiment, dynamic AR object program 101 determines a users' level of interest based on the number of times the user looks at a particular object in a predetermined amount of time in their field of view.

In an embodiment, dynamic AR object program 101 determines a user's reading speed by historical reading speeds or browsing history. In an embodiment, dynamic AR object program 101 displays to the user a predetermined amount of words and times the amount of time it takes for the user to read the words. For example, dynamic AR object program 101 presents 500 words to the user and it takes the user 2 minutes to read the 500 words. Here, dynamic AR object program 101 determines the users reading speed is 250 words per minute and saves this information in AR object user attribute database 132. In an embodiment, dynamic AR object program 101 determines a user's interest. In an embodiment, dynamic AR object program 101 tracks the users eye movement and duration when an object is present in the users field of view. For example, if a billboard depicting a book sale and a pasture of cows are present in the users field of view and the user looks at the billboard depicting a book sale for the entire duration it is in the users field of view, dynamic AR object program 101 determines "books" and "reading" are of interest to the user.

In an embodiment, dynamic AR object program 101 monitors and determines the users relative motion and direction of movement. For example, if user is in a car traveling 60 mph southeast, dynamic AR object program 101 determines the user is moving 60 mph. In an embodiment, dynamic AR object program 101 utilizes a compass or global positioning system to determine the direction and/or speed the user is traveling. For example, dynamic AR object program 101 utilizes a digital compass to determine the user is moving in a southeast direction. In an embodiment, dynamic AR object program 101 determines an object in the users field of view. For example, dynamic AR object program 101 determines there is a billboard for an antique automobile shop in the users field of view. In an embodiment, dynamic AR object program 101 accesses user interest database 134 and determines users interest includes antique cars and determines the billboard for an antique automobile shop is an object of interest to the user. In an embodiment, dynamic AR object program 101 accesses AR object user attribute database 132 to determine the users reading speed. In an embodiment, dynamic AR object program 101 determines the length of time the user needs to understand or read the object of interest. In the previous example, dynamic AR object program 101 accesses AR object user attribute database 132 to determine the length of time the user requires to understand or read the billboard for an antique automobile shop.

In an embodiment, dynamic AR object program 101 determines the amount of content the user will be able to consume with AR object relative to movement of user and positioning of the physical object. In an embodiment, dynamic AR object program 101 determines if the user will be able to understand or read the AR object of interest in the duration of time the physical object is in the user's AR point of view. For example, if dynamic AR object program 101 determines it will take the user 15 seconds to read the object of interest but based on the movement of both the physical object and the user the physical object will only be in the users AR point of view for 10 seconds, dynamic AR object program 101 determines the object of interest will not be in the users AR field of view long enough for the user to fully read it. In another example, if the user is moving at 60 mph east, and the object of interest is 0.25 miles away east, dynamic AR object program 101 determines the object of interest will be in the users field of view for 15 seconds. Here, if dynamic AR object program 101 determines the user needs 20 seconds to understand the object of interest, dynamic AR object program 101 determines the object of interest will not be in the users AR field of view long enough for the user to fully understand it.

In an embodiment, dynamic AR object program 101 adjusts the AR object of interest based, at least in part, on the amount of time the user needs to read or understand the object of interest. From example, if dynamic AR object program 101 determines the user needs 15 seconds to read a billboard but the billboard is only in the users point of view for 10 seconds, dynamic AR object program 101 summarizes or shortens the message on the billboard via an AR digital object in order for the user to fully understand or read the billboard before it is out of the users point of view. In an embodiment, dynamic AR object program 101 lengthens the amount of time the AR digital object of interest is in the users field of view in order for the user to fully understand or read the object of interest. For example, if dynamic AR object program 101 determines the user needs 15 seconds to read a billboard but the billboard will only be in the users point of view for 10 seconds before it exits the users point of view based on the users relative velocity to the billboard, dynamic AR object program 101 lengthens the amount of time the augmented version of the billboard is in the users field of view to 15 seconds to ensure the user reads and understands the billboard before it is out of the users AR point of view. Meaning, dynamic AR object program 101 adjust the AR point of view to continue to show the billboard in the AR point of view even after the billboard is no longer in the users FOV. In an embodiment, dynamic AR object program 101 enlarges the object of interest in the users AR field of view. In these embodiments, dynamic AR object program 101 adjust the AR digital object of the physical object in the users AR field of view when the user is further away from the object. Since, objects become larger as a user becomes closer to them, the user will have more time to understand or read a larger object or text in their field of view. In return, the user will understand or read the object of interest quicker if the object of interest is enlarged in the users field of view.

In an embodiment, dynamic AR object program 101 determines one or more objects of interest in the user's field of view. In an embodiment, dynamic AR object program 101 displays the object of interest with the highest level of interest in the AR field of view. For example, dynamic AR object program 101 determines a sculpture with a level of interest of 7 and a tree with a level of interest of 2 in the users field of view. In this example, dynamic AR object program 101 enlarges the sculpture since the level of interest of the sculpture is higher than the tree. In an embodiment, dynamic AR object program 101 displays an object of interest above a predetermined level of interest in the AR field of view. In an example, dynamic AR object program 101 determines a sculpture with a level of interest of 7, flowers with a level of interest of 5, and a tree with a level of interest of 2 in the user's field of view. In this example, the predetermined level of interest threshold is 4. In this example, dynamic AR object program 101 enlarges and displays the sculpture and flowers since the sculpture and flowers are above the predetermined level of interest threshold. However, dynamic AR object program 101 does not display the tree since the tree is below the predetermined level of interest threshold.

In an embodiment, dynamic AR object program 101 indicates to or notifies the users an object will be leaving the users field of view within a predetermined amount of time. In an embodiment, dynamic AR object program 101 displays visual indicators or uses sound to indicate an object will be leaving the users field of view within the predetermined amount of time. For example, if based on the relative motion and position of both the user and the object of interest the object of interest will only be in the users field of view for 3 more seconds, dynamic AR object program 101 displays a three second countdown in the users augmented reality field of view.

In an embodiment, dynamic AR object program 101 adjusts the speed or direction of a vehicle to maximize the amount of time the user may view the object of interest. For example, if user is traveling 50 mph in an autonomous vehicle and dynamic AR object program 101 determines the user needs 15 seconds to read a billboard but the billboard is only in the users point of view for 10 seconds, dynamic AR object program 101 slows or decreases the autonomous vehicles speed to 35 mph in order to maximize the time the user needs to read the billboard. In an embodiment, dynamic AR object program 101 adjusts the movement or speed of the autonomous vehicle is only done if safe, permitted, and follows rules of the road. For example, if it is determined another vehicle is closely behind the autonomous vehicle, dynamic AR object program 101 does not adjusts the speed of the autonomous vehicle.

In an embodiment, dynamic AR object program 101 determines the users travel route. For example, dynamic AR object program 101 determines the users travel route is to city A based on a GPS map destination. In an embodiment, dynamic AR object program 101 determines objects of interest along the travel route. For example, if user is traveling from city A to city B, dynamic AR object program 101 determines objects of interest along the travel route such as landmarks, shopping malls, or schools.

In an embodiment, dynamic AR object program 101 tracks a user's eye movement to determine where the user is looking in the AR field of view. In an embodiment, dynamic AR object program 101 removes an object from the users AR field of view if a user is not looking at the object. For example, if dynamic AR object program 101 determines an object of interest needs to be in users AR field of view for 10 seconds but the user stops looking at the object of interest after 3 seconds, dynamic AR object program 101 removes the object of interest from the users AR field of view.

In an embodiment, dynamic AR object program 101 determines, based on historical learning data (e.g., sensor data, website data, social media data, electronic messaging data, etc.), a set of interests for a user. In an embodiment, dynamic AR object program 101 determines, that an object within a FOV of the user should be displayed on an AR device worn by the user. In an embodiment, dynamic AR object program 101 determines, based on the user's current position, current velocity, and the set of user interests, an amount of time the object should be displayed on the AR device and an amount of content related to the object that should be displayed on the AR device. In an embodiment, dynamic AR object program 101 determines, via eye-tracking, the user's interest in the object and the content related to the object. In an embodiment, dynamic AR object program 101 adjust the amount of time the object should be displayed on the AR device based on the determined user interest in the object and the content related to the object.

In an embodiment, dynamic AR object program 101 determines, based on the user's relative position and movement with respect to the physical object of interest, that the physical object will become illegible prior to the determined amount of time required for the physical object of interest to be displayed within the user's augmented reality field of view. In an embodiment, dynamic AR object program 101 responsive to determining, based on the user's relative position and movement with respect to the physical object of interest that the physical object will become illegible prior to the determined amount of time required for the physical object of interest to be displayed within the user's augmented reality field of view, dynamic AR object program 101 generates an enlarged digital version of the physical object of interest within the user's augmented reality field of view prior to the physical object becoming illegible.

In an embodiment, dynamic AR object program 101 identifies a physical object of interest in a user's augmented reality field of view. In an embodiment, dynamic AR object program 101 identifies a physical object of interest based on user input, user movement, or user eye movement. In an embodiment, dynamic AR object program 101 determines an amount of time required for the physical object of interest to be displayed within the user's augmented reality field of view, based, at least in part, on the user's relative position and movement with respect to the physical object of interest. In an embodiment, dynamic AR object program 101 determines the physical object of interest is no longer in the user's physical field of view prior to an expiration of the determined amount of time required for the physical object to be displayed within the user's augmented reality field of view. In an embodiment, dynamic AR object program 101 displays, in response to determining that the physical object of interest is no longer in the user's augmented reality field of view prior to the expiration of the determined amount of time, a digital object corresponding to the physical object of interest in the users augmented reality field of view until the determined amount of time required for the physical object to be displayed within the user's augmented reality field of view has expired.

Figure 2:
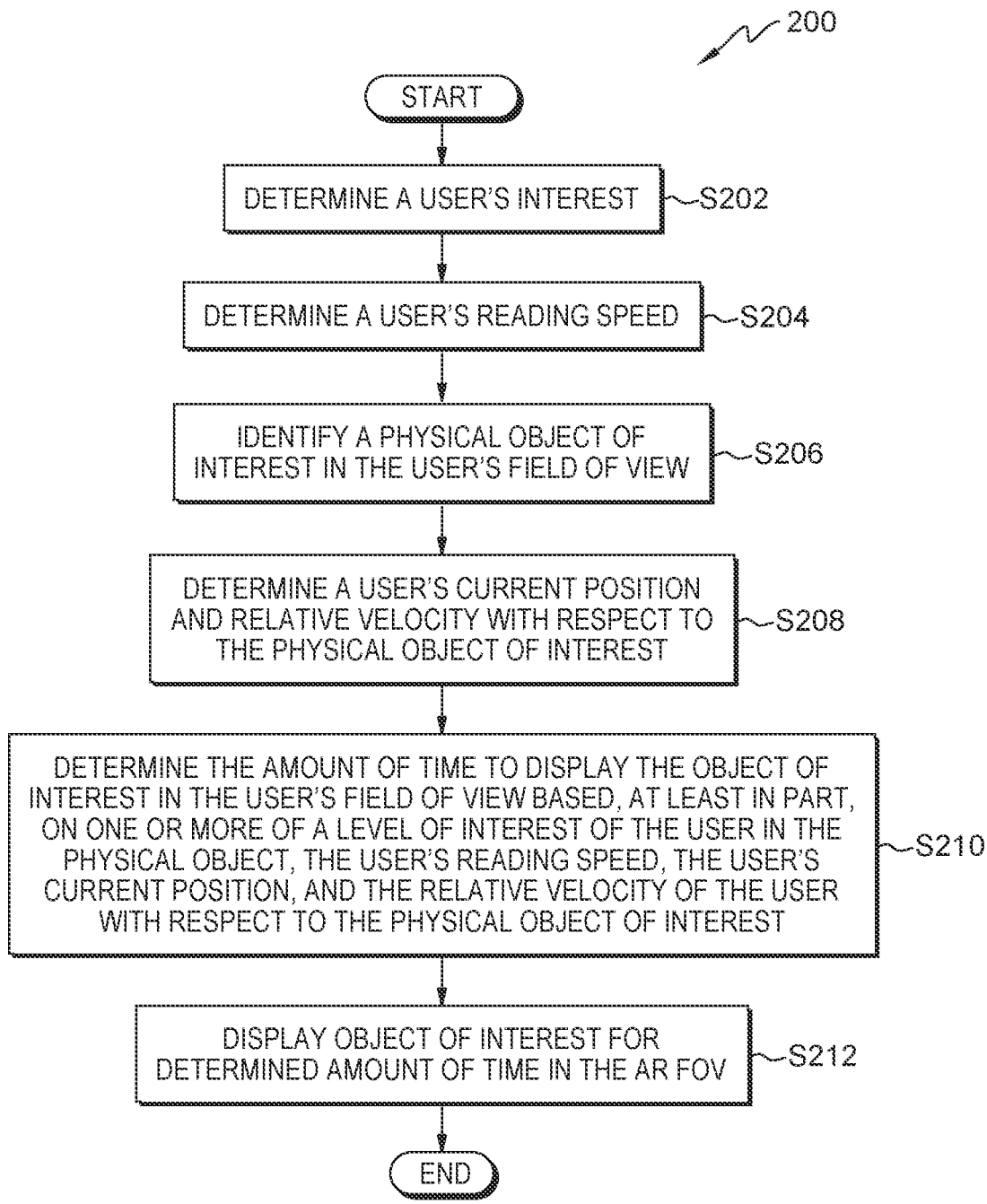
FIG. 2 is a flow chart diagram depicting operational steps for dynamic AR object program 101, generally designated 200, in accordance with at least one embodiment of the present invention.

FIG. 2 is a flow chart diagram depicting operational steps for dynamic AR object program 101, generally designated 200, in accordance with at least one embodiment of the present invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

At step S202, dynamic AR object program 101 determines a user's interest. In an embodiment, dynamic AR object program 101 receives the user's interest. In an embodiment, dynamic AR object program 101 determines the users' level of interest.

At step S204, dynamic AR object program 101 determines a user's reading speed. In an embodiment, dynamic AR object program 101 accesses AR object user attribute database 132 to determine a user's reading speed.

At step S206, dynamic AR object program 101 identifies a physical object of interest in the user's field of view. In an embodiment, dynamic AR object program 101 displays an object of interest above a predetermined level of interest in the AR field of view. In an embodiment, dynamic AR object program 101 displays the object of interest with the highest level of interest in the AR field of view.

At step S208, dynamic AR object program 101 determines a user's current position and relative velocity with respect to the physical object of interest.

At step S210, dynamic AR object program 101 determines the amount of time to display the object of interest in the user's field of view based, at least in part, on one or more of a level of interest of the user in the physical object, the user's reading speed, the user's current position, and the relative velocity of the user with respect to the physical object of interest.

At step S212, dynamic AR object program 101 displays the object of interest for the determined amount of time in the augmented reality field of view.

Figure 3:
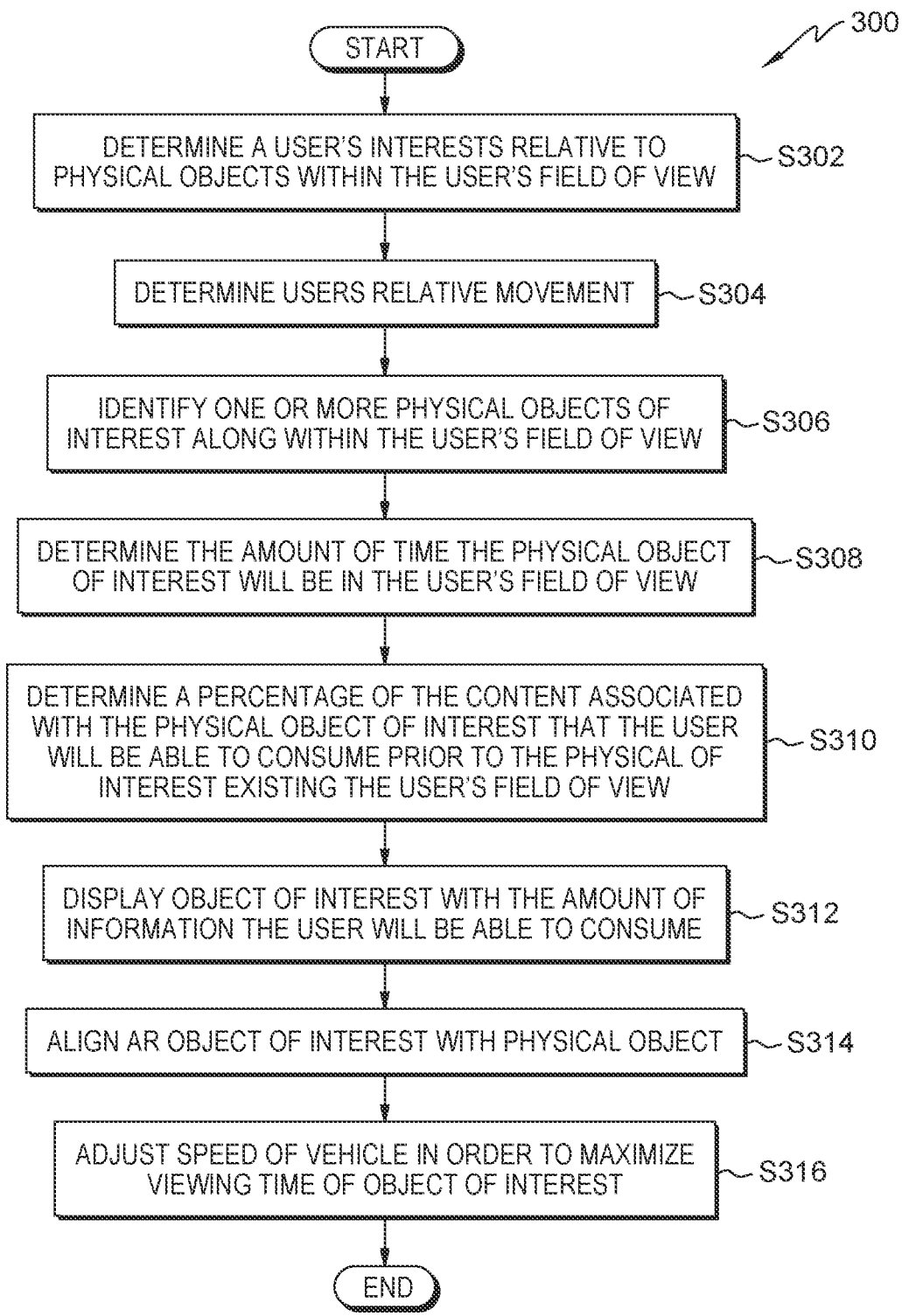
FIG. 3 is a flow chart diagram depicting operational steps for dynamic AR object program 101, generally designated 300, in accordance with at least one embodiment of the present invention.

FIG. 3 is a flow chart diagram depicting operational steps for dynamic AR object program 101, generally designated 300, in accordance with at least one embodiment of the present invention. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

At step S302, dynamic AR object program 101 determines a user's interests relative to physical objects within the user's field of view. In an embodiment, dynamic AR object program 101 receives user's interest.

At step S304, dynamic AR object program 101 determines the user's relative movement. In an embodiment, dynamic AR object program 101 determines one or more of the user's position, speed, velocity, direction of movement.

At step S306, dynamic AR object program 101 identifies one or more physical objects of interest along within the user's field of view. In an embodiment, dynamic AR object program 101 determines the users relative distance, relative speed, velocity, direction of movement respective to the object of interest.

At step S308, dynamic AR object program 101 determines the amount of time the physical object of interest will be in the user's field of view. In an embodiment, dynamic AR object program 101 determines the amount of time the object of interest will be in the users field of view based, at least in part, on the users relative distance, relative speed, velocity, direction of movement respective to the object of interest.

At step S310, dynamic AR object program 101 determines a percentage of the content associated with the physical object of interest that the user will be able to consume prior to the physical of interest existing the user's field of view. In an embodiment, dynamic AR object program 101 determines the amount of content the user will be able to consume based, at least in part, on the users reading speed, the direction of movement of the user, an initial distance of the physical object from the user at a point when the physical object first enters the user's field of view, and the speed of the user.

At step S312, dynamic AR object program 101 displays the object of interest with the amount of information the user will be able to consume. In an embodiment, dynamic AR object program 101 summarizes or shortens the information pertaining to the object of interest in order for the user to consume the amount of information in time.

At step S314, dynamic AR object program 101 aligns the AR object of interest with the physical object. In an embodiment, dynamic AR object program 101 overlaps the visual of the AR object of interest displayed in the AR field of view with the physical object in the physical environment.

At step S316, dynamic AR object program 101 adjusts the speed of vehicle in order to maximize the viewing time of the object of interest. In an embodiment, dynamic AR object program 101 slows the velocity of the vehicle to maximize the viewing time of the object of interest. In an embodiment, dynamic AR object program 101 alters the direction of the vehicle to maximize the viewing time of the object of interest.

Figure 4:
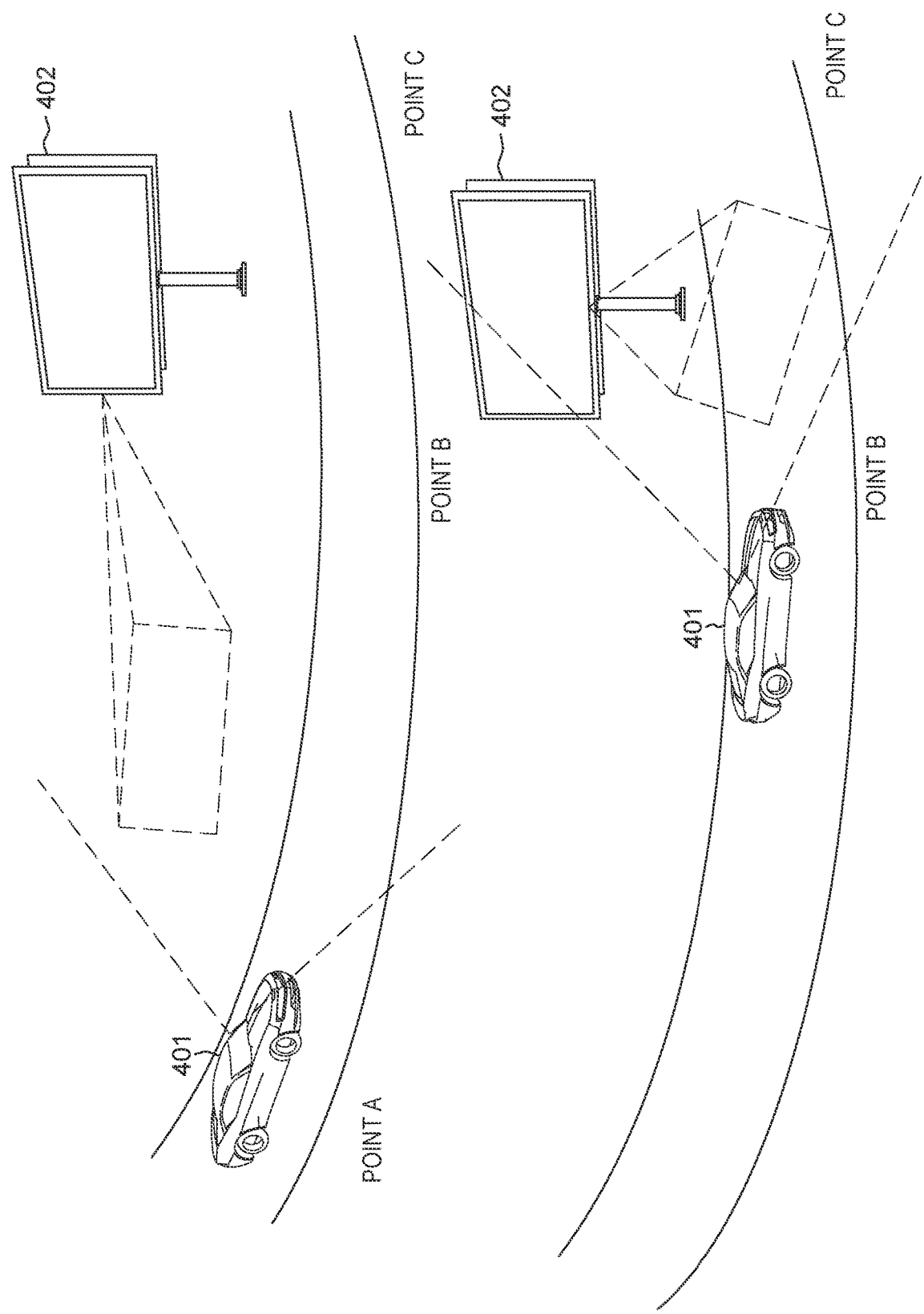
FIG. 4 is a worked example of a user in motion using dynamic AR object program 101, generally designated 400.

FIG. 4 is a worked example of a user in motion using dynamic AR object program 101, generally designated 400. Here, user is traveling from Point A to Point C in vehicle 401. At Point A, object of interest 402 enters the users AR field of view. At Point A, dynamic AR object program 101 determines the distance from Point A where the user is and Point B where object of interest 402. Further, dynamic AR object program 101 determines the amount of time it will take the user to fully understand object of interest 402. Dynamic AR object program 101 determines how long it will take user to travel from Point A to Point B, where object of interest 402 will then become out of site. Here, dynamic AR object program 101 determines it will take "t" time for the user to travel from Point A to Point B. Dynamic AR object program 101 further determines it will take "t+5" time for the user to fully understand object of interest 402. Dynamic AR object program 101 decreases the velocity of vehicle 401 in order for the time it takes user to travel from Point A to Point B is greater than "t+5" time.

FIG. 5 is a block diagram depicting components of a computing device, generally designated 500, suitable for dynamic AR object program 101 in accordance with at least one embodiment of the invention. Computing device 500 includes one or more processor(s) 504 (including one or more computer processors), communications fabric 502, memory 506 including, RAM 516 and cache 518, persistent storage 508, which further includes dynamic AR object program 101, communications unit 512, I/O interface(s) 514, display 522, and external device(s) 520. It should be appreciated that FIG. 5 provides only an illustration of one embodiment and does not imply any limitations with regard to the environments in which different embodiments may be implemented. Many modifications to the depicted environment may be made.

As depicted, computing device 500 operates over communications fabric 502, which provides communications between computer processor(s) 504, memory 506, persistent storage 508, communications unit 512, and input/output (I/O) interface(s) 514. Communications fabric 502 can be implemented with any architecture suitable for passing data or control information between processor(s) 504 (e.g., microprocessors, communications processors, and network processors), memory 506, external device(s) 520, and any other hardware components within a system. For example, communications fabric 502 can be implemented with one or more buses.

Memory 506 and persistent storage 508 are computer readable storage media. In the depicted embodiment, memory 506 includes random-access memory (RAM) 516 and cache 518. In general, memory 506 can include any suitable volatile or non-volatile computer readable storage media.

Program instructions for dynamic AR object program 101 can be stored in persistent storage 508, or more generally, any computer readable storage media, for execution by one or more of the respective computer processor(s) 504 via one or more memories of memory 506. Persistent storage 508 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 can include one or more network interface cards. Communications unit 512 may provide communications through the use of either or both physical and wireless communications links. In the context of some embodiments of the present invention, the source of the various input data may be physically remote to computing device 500 such that the input data may be received, and the output similarly transmitted via communications unit 512.

I/O interface(s) 514 allows for input and output of data with other devices that may operate in conjunction with computing device 500. For example, I/O interface(s) 514 may provide a connection to external device(s) 520, which may be as a keyboard, keypad, a touch screen, or other suitable input devices. External device(s) 520 can also include portable computer readable storage media, for example thumb drives, portable optical or magnetic disks, and memory cards. Software and data used to practice embodiments of the present invention can be stored on such portable computer readable storage media and may be loaded onto persistent storage 508 via I/O interface(s) 514. I/O interface(s) 514 also can similarly connect to display 522. Display 522 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 6 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 7:
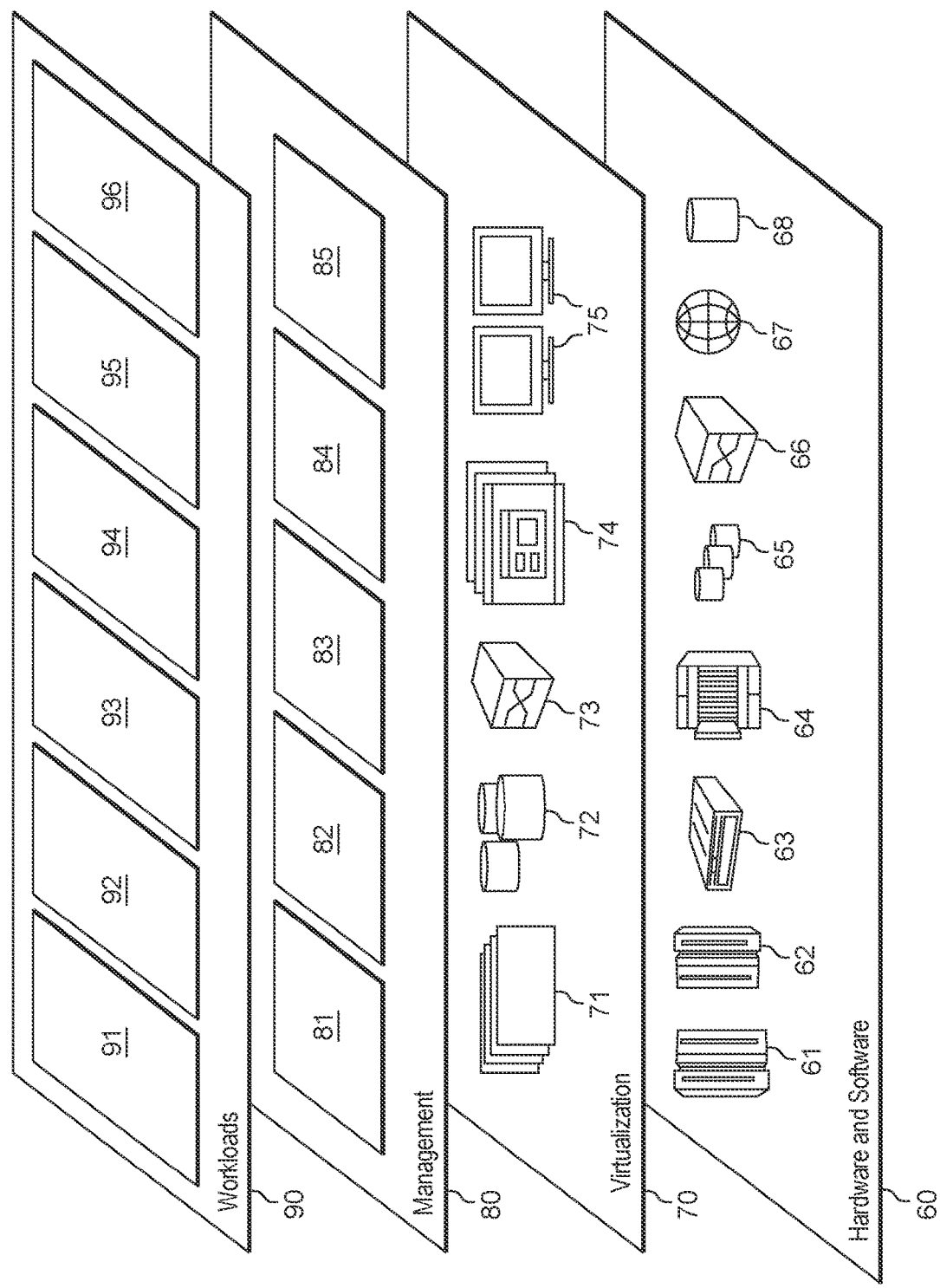
FIG. 7 is a block diagram depicting a set of functional abstraction model layers provided by cloud computing environment 50 depicted in FIG. 6 in accordance with at least one embodiment of the present invention.

FIG. 7 is block diagram depicting a set of functional abstraction model layers provided by cloud computing environment 50 depicted in FIG. 5 in accordance with at least one embodiment of the present invention. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic AR processing 96.

What is claimed is:

1. A computer-implemented method for displaying an augmented reality object, the computer-implemented method comprising:
    identifying a physical object of interest in a user's augmented reality field of view;
    determining an amount of time required for the physical object of interest to be displayed within the user's augmented reality field of view, based, at least in part, on the user's relative position and movement with respect to the physical object of interest;
    determining the physical object of interest is no longer in the user's physical field of view prior to an expiration of the determined amount of time required for the physical object to be displayed within the user's augmented reality field of view; and
    displaying, in response to determining that the physical object of interest is no longer in the user's augmented reality field of view prior to the expiration of the determined amount of time, a digital object corresponding to the physical object of interest in the users augmented reality field of view until the determined amount of time required for the physical object to be displayed within the user's augmented reality field of view has expired.

2. The computer-implemented method of claim 1, further comprising:
    dynamically altering the movement of an autonomous vehicle based, at least in part, on the determined amount of time required for the physical object of interest to be displayed within the user's augmented reality field of view.

3. The computer-implemented method of claim 1, further comprising:
   determining a priority level for one or more objects in the users augmented reality field of view;
   selecting a rule based, at least in part, on the determined priority level; and
   displaying the object of interest in the users augmented reality field of view based, at least in part, on the selected rule.

4. The computer-implemented method of claim 3, wherein displaying, in response to determining that the physical object of interest is no longer in the user's augmented reality field of view further comprises displaying an object with the highest priority level in the user's augmented reality field of view for the determined amount of time required for the physical object of interest to be displayed within the user's augmented reality field of view after the physical object of interest.

5. The computer-implemented method of claim 1, wherein determining an object of interest is based, at least in part on the user's interest level associated with a physical object in the user's augmented reality field of view.

6. The computer-implemented method of claim 1, wherein displaying the object of interest further comprises adjusting the object of interest above a predetermined size based, at least in part, on the users visual acuity.

7. The computer-implemented method of claim 1, further comprising:
   determining, based on the user's relative position and movement with respect to the physical object of interest, that the physical object will become illegible prior to the determined amount of time required for the physical object of interest to be displayed within the user's augmented reality field of view; and
   responsive to determining, based on the user's relative position and movement with respect to the physical object of interest that the physical object will become illegible prior to the determined amount of time required for the physical object of interest to be displayed within the user's augmented reality field of view:
      generating an enlarged digital version of the physical object of interest within the user's augmented reality field of view prior to the physical object becoming illegible.

8. A computer program product for displaying an augmented reality object, the computer program product comprising one or more non-transitory computer readable storage media and program instructions stored on the one or more non-transitory computer readable storage media, the program instructions including instructions to:
   identify a physical object of interest in a user's augmented reality field of view;
   determine an amount of time required for the physical object of interest to be displayed within the user's augmented reality field of view, based, at least in part, on the user's relative position and movement with respect to the physical object of interest;
   determine the physical object of interest is no longer in the user's physical field of view prior to an expiration of the determined amount of time required for the physical object to be displayed within the user's augmented reality field of view; and
   display, in response to determining that the physical object of interest is no longer in the user's augmented reality field of view prior to the expiration of the determined amount of time, a digital object corresponding to the physical object of interest in the users augmented reality field of view until the determined amount of time required for the physical object to be displayed within the user's augmented reality field of view has expired.

9. The computer program product of claim 8, further comprising instructions to:
   dynamically alter the movement of an autonomous vehicle based, at least in part, on the determined amount of time required for the physical object of interest to be displayed within the user's augmented reality field of view.

10. The computer program product of claim 8, further comprising instructions to:
    determine a priority level for one or more objects in the users augmented reality field of view;
    select a rule based, at least in part, on the determined priority level; and
    display the object of interest in the users augmented reality field of view based, at least in part, on the selected rule.

11. The computer program product of claim 10, wherein instructions to display, in response to determining that the physical object of interest is no longer in the user's augmented reality field of view further comprises instructions to display an object with a highest priority level in the user's augmented reality field of view for the determined amount of time required for the physical object of interest to be displayed within the user's augmented reality field of view after the physical object of interest.

12. The computer program product of claim 8, wherein determining an object of interest is based, at least in part on the user's interest level associated with a physical object in the user's augmented reality field of view.

13. The computer program product of claim 8, wherein displaying the object of interest further comprises adjusting the object of interest above a predetermined size based, at least in part, on the user's visual acuity.

14. The computer program product of claim 8, further comprising instructions to:
    determine, based on the user's relative position and movement with respect to the physical object of interest, that the physical object will become illegible prior to the determined amount of time required for the physical object of interest to be displayed within the user's augmented reality field of view; and
    responsive to determining, based on the user's relative position and movement with respect to the physical object of interest that the physical object will become illegible prior to the determined amount of time required for the physical object of interest to be displayed within the user's augmented reality field of view:
       generate an enlarged digital version of the physical object of interest within the user's augmented reality field of view prior to the physical object becoming illegible.

15. A computer system for displaying an augmented reality object, comprising:
    one or more computer processors;
    one or more computer readable storage media;
    computer program instructions;

the computer program instructions being stored on the one or more computer readable storage media for execution by the one or more computer processors; and the computer program instructions including instructions to:

identify a physical object of interest in a user's augmented reality field of view;

determine an amount of time required for the physical object of interest to be displayed within the user's augmented reality field of view, based, at least in part, on the user's relative position and movement with respect to the physical object of interest;

determine the physical object of interest is no longer in the user's physical field of view prior to an expiration of the determined amount of time required for the physical object to be displayed within the user's augmented reality field of view; and display, in response to determining that the physical object of interest is no longer in the user's augmented reality field of view prior to the expiration of the determined amount of time, a digital object corresponding to the physical object of interest in the users augmented reality field of view until the determined amount of time required for the physical object to be displayed within the user's augmented reality field of view has expired.

16. The computer system of claim 15, further comprising instructions to:

dynamically alter the movement of an autonomous vehicle based, at least in part, on the determined amount of time required for the physical object of interest to be displayed within the user's augmented reality field of view.

17. The computer system of claim 15, further comprising instructions to:

determine a priority level for one or more objects in the users augmented reality field of view;

select a rule based, at least in part, on the determined priority level; and display the object of interest in the users augmented reality field of view based, at least in part, on the selected rule.

18. The computer system of claim 17, wherein instructions to display, in response to determining that the physical object of interest is no longer in the user's augmented reality field of view further comprises instructions to display an object with a highest priority level in the user's augmented reality field of view for the determined amount of time required for the physical object of interest to be displayed within the user's augmented reality field of view after the physical object of interest.

19. The computer system of claim 15, wherein determining an object of interest is based, at least in part on the user's interest level associated with a physical object in the user's augmented reality field of view.

20. The computer system of claim 15, further comprising instructions to:

determine, based on the user's relative position and movement with respect to the physical object of interest, that the physical object will become illegible prior to the determined amount of time required for the physical object of interest to be displayed within the user's augmented reality field of view; and responsive to determining, based on the user's relative position and movement with respect to the physical object of interest that the physical object will become illegible prior to the determined amount of time required for the physical object of interest to be displayed within the user's augmented reality field of view:

generate an enlarged digital version of the physical object of interest within the user's augmented reality field of view prior to the physical object becoming illegible.

* * * * *